(12) United States Patent
Danten

(10) Patent No.: US 8,708,258 B2
(45) Date of Patent: Apr. 29, 2014

(54) METHOD FOR DECLADDING NUCLEAR FUEL AND CRUSHING MACHINE BY CLADDING DEFORMATION

(75) Inventor: Hubert Danten, Beaumont-Hague (FR)

(73) Assignee: Areva NC, Paris (FR)

( * ) Notice: Subject to any disclaimer, the term of this patent is extended or adjusted under 35 U.S.C. 154(b) by 128 days.

(21) Appl. No.: 13/126,159

(22) PCT Filed: Nov. 6, 2009

(86) PCT No.: PCT/EP2009/064736
§ 371 (c)(1),
(2), (4) Date: Apr. 26, 2011

(87) PCT Pub. No.: WO2010/052298
PCT Pub. Date: May 14, 2010

(65) Prior Publication Data
US 2011/0204167 A1    Aug. 25, 2011

(30) Foreign Application Priority Data
Nov. 6, 2008 (FR) ..................................... 08 57550

(51) Int. Cl.
*B02C 19/00* (2006.01)
*B02C 25/00* (2006.01)

(52) U.S. Cl.
USPC ............................................ 241/3; 241/30

(58) Field of Classification Search
USPC .................. 241/3, 30; 72/197, 252.5
See application file for complete search history.

(56) References Cited

U.S. PATENT DOCUMENTS

| 4,848,124 A | * | 7/1989 | Biller et al. | 72/97 |
| 5,699,690 A | * | 12/1997 | Furugen et al. | 72/69 |
| 6,216,517 B1 | * | 4/2001 | Hein | 72/236 |

FOREIGN PATENT DOCUMENTS

| EP | 0169629 A2 | 1/1986 |
| FR | 1452479 A | 2/1966 |
| GB | 2067342 A | 7/1981 |
| HU | 48046 A2 | 4/1989 |
| JP | 63182599 A | * | 7/1988 |

OTHER PUBLICATIONS

International Search Report in International Application No. PCT/EP2009/064736, mailed Jan. 29, 2010.
French Search Report in French Application No. FR 0857550, dated Apr. 3, 2009.

* cited by examiner

*Primary Examiner* — Shelley Self
*Assistant Examiner* — Chwen-Wei Su
(74) *Attorney, Agent, or Firm* — Nixon Peabody LLP

(57) ABSTRACT

A machine comprising two rollers for ovalizing a nuclear fuel cladding to crush the content thereof allowing its easy release even if the pellets are arranged in the cladding with little clearance. The opposite inclinations of the rollers promote automatic forward travel of the claddings. The opening and the inclination of the claddings lead to release of the crushed fuel. The rollers are biconical, with an input portion of increasing diameter and an output portion of decreasing diameter, to apply sufficient ovalizations to crush the fuel while restoring rotundity to the cladding when it leaves the machine, to facilitate the outflow of debris.

8 Claims, 2 Drawing Sheets

METHOD FOR DECLADDING NUCLEAR FUEL AND CRUSHING MACHINE BY CLADDING DEFORMATION

CROSS REFERENCE TO RELATED APPLICATIONS OR PRIORITY CLAIM

Figure 1:
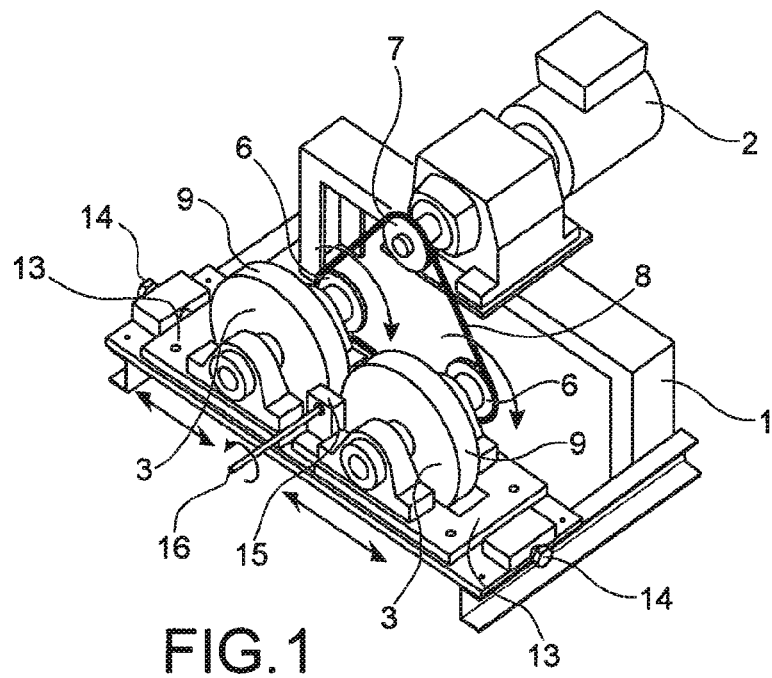

This application is a National Phase of PCT/EP2009/064736, filed Nov. 6, 2009, entitled, "METHOD FOR EMPTYING NUCLEAR FUEL SHEATHS AND SHEATH-DEFORMATION CRUSHING MACHINE", and which claims priority of French Patent Application No. 08 57550, filed Nov. 6, 2008.

The subject-matter of this invention is a method for releasing nuclear fuel from cladding and a machine for crushing this fuel, in a compact state, by applying deformation to the cladding.

The treatment or recycling of nuclear fuel generally involves shearing of the cladding to allow dissolution in nitric acid of the fuel released on shearing and of the fuel remaining lodged in pieces of sheared cladding known as <<hulls>>.

With respect to the cladding of non-irradiated MOX, RNR or LWR fuel, it is desirable previously to separate the claddings and fuel by emptying the fuel content of the cladding since the fuel is not easily dissolved with the hull, and in addition the fuel in pellet form must be crushed before dissolution treatment to improve such treatment by increasing the surface area for acid attack.

One conventional method for decladding nuclear fuel comprises opening the claddings with a tool then tilting the claddings so that the fuel can escape. Difficulties occur however in numerous cases, and notably when the fuel pellets have little clearance with the cladding (less than about 0.2 mm), if they have swollen between cladding and decladding, or if they have become chipped and broken-off chips cause jamming of the pellets in the cladding. As a result, the pellets cannot be released on tilting the cladding.

Other decladding methods have been patented. Mention may be made of documents HU-A-48046 (available via abstract XP 002 469 759), EP-A-0 169 129, or FR-A-1 452 479. Several thereof apply plastic deformation to the cladding using rollers to create contact pressure, leading to crushing of the cladding material to reduce its thickness and correlatively increase its diameter. According to these patents, the clearance with the fuel, which remains compact, is increased, thereby facilitating release of the fuel. However, these methods depend firstly on the presence of contiguous pellets in compact state inside the cladding, and secondly on the maintained compact state of the pellets (intact pellets) under the effect of the rolling pressure required to reduce the thickness of the claddings. These methods may therefore remain insufficient in the presence of brittle pellets that are non-homogeneous in diameter and/or which have become chipped in the cladding, thereby leading to deteriorations or breaks in the reduced thickness of the cladding at these points, and hence to breaks in the expected increase in cladding diameter, to irregularities in cladding shape thereby forming further obstacles for fuel release due to jamming.

Another important condition for the proper conducting of these methods is that the cutting to open the cladding, allowing fuel release, must be made flush with the first fuel pellet to avoid roller pressure from producing a narrowed neck at this opening which would oppose release of the pellets. This narrowing is ascertained even if the distance between the opening and the end part of the fuel is as low as 0.5 or 1 mm. Yet, the opening is normally made at a distance from the fuel, which could damage the cutting tool should it come into contact therewith, and the end part of the fuel at all events is difficult to determine: narrowing therefore occurs and this may hamper release of the fuel.

Document JP-A-63 182 559 describes the passing of a fuel cladding between pairs of fairly close-lying rollers thereby producing quite substantial ovalisation of the cladding to crush the fuel i.e. causing it to change from a compact state in which it is divided into pellets of regular shape, to a fragmented state in which the pellets are broken into smaller pieces or powdered. One drawback of this method is that the ovalisation produced by the last pair of rollers is definitive and may therefore also jeopardize fuel release if crushing is incomplete.

The present invention sets out to improve methods for decladding nuclear fuel which entail cladding deformation, the extent of deformation being sufficient to produce crushing of the fuel initially in the compact state. The characteristic of the invention is that the deformation of sections of the cladding is not definitive, but on the contrary it is reduced at a final step so as to restore the original rotundity of the cladding at least to a large extent (variations in cladding diameter after treatment being less than 0.05 mm). This dual originality plays a part in ensuring that fuel removal is much improved compared with previously known methods.

One aspect of the invention is therefore a method for decladding nuclear fuel, the fuel being in the compact state, comprising a step consisting of placing the cladding in a machine which applies deformation to the cladding by means of repeated ovalisation over a plurality of cycles causing plastic deformation of the cladding, characterized in that ovalisation over the cycles is progressive from one cycle to another and then degressive, so as to crush the fuel then restore the original circular shape to the cladding.

Ovalisation is the deforming of initially round sections to an oval shape by flattening. Ovalisation cycles correspond to half-turns of the cladding (which is placed under constant rotation), so that each point of a section of the cladding deformed by the rollers is brought to a maximum radius and a minimum radius of the defined oval shape created by the rollers over one cycle. Strong ovalisation corresponds to greater flattening of a section of the cladding. Progressive ovalisation corresponds to increasingly greater flattening of one same section of the cladding from one cycle to another, as and when it moves between the rollers, and reciprocally degressive ovalisation corresponds to increasingly lesser flattening from one cycle to another. Maximum ovalisation within one cycle can be defined as the passing of one point of the section through the largest radius or smallest radius of the oval shape. Ovalisations can be measured using any criterion expressing the difference or ratio between the largest radius and smallest radius of the oval shape, or between one of these radii and the original radius of the round shape before deformation.

Ovalisation is preferably applied with substantial force to crush the fuel over at least 40 cycles to guarantee fine crushing.

It can be applied to an extent allowing a reduction in fuel diameter of at least 3% compared with the diameter when in the compact pellet state.

The invention also concerns a machine for applying deformation to nuclear fuel claddings, which is capable of implementing this method. It comprises a pair of opposite-facing rollers between which the claddings are passed, and a motor to set the rollers in rotation; it is characterized in that the rollers comprise a peripheral edge with a conical leading portion and a conical output portion, these two portions both extending towards a central portion of the roller, and in that the rollers have axes of rotation that are essentially parallel to a direction of travel of the claddings through the machine, so that all said portions of the edge of the rollers contribute towards deforming the claddings. This structure of the rollers allows progressive application of sufficient deformation to the cladding to crush the fuel, followed by gradual reduction of deformation to restore the cladding to the original circular shape.

The characteristic shape of the roller of the invention is thick in the centre and tapered at the ends, and hence convex, to be distinguished from the concave shape of the rollers in document JP-A-63 182 559 which also have axes essentially perpendicular to the direction of the cladding, unlike the rollers of the invention.

The leading portion and the output portion are sufficiently wide and thick to impose two series of ovalisations upon the cladding, and are to be distinguished from the end faces of the rollers which are only limits and do not exert any pressure.

The central portion is advantageously cylindrical to apply the greatest deformation over a sufficient number of ovalisation cycles. Therefore, it is often a fairly wide portion.

According to another improvement, the rollers, with axes of rotation essentially parallel to a direction of travel of the claddings through the machine, are nonetheless tilted in directions opposite the said direction, the tilt angle possibly being 2° or less with this direction. Deformation by the rollers is then accompanied not only by rotation of the cladding, but also by travel thereof at a speed that is sufficiently slow to allow the number of desired ovalisations before each section of the cladding has passed through the inter-roller space.

The machine advantageously comprises a cladding-guide which is tilted in horizontal direction (in the assembled state of the machine) which allows the fuel to be removed from the cladding as and when it is crushed. Efficient fuel removal is better guaranteed even with long lengths of cladding.

Figure 2:
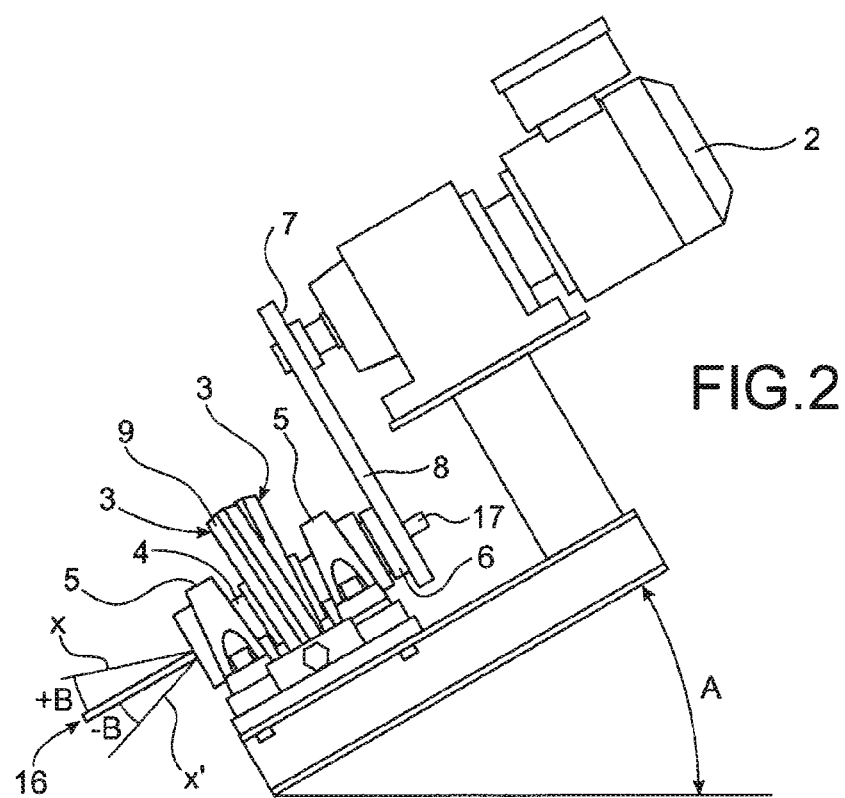
Figure 3:
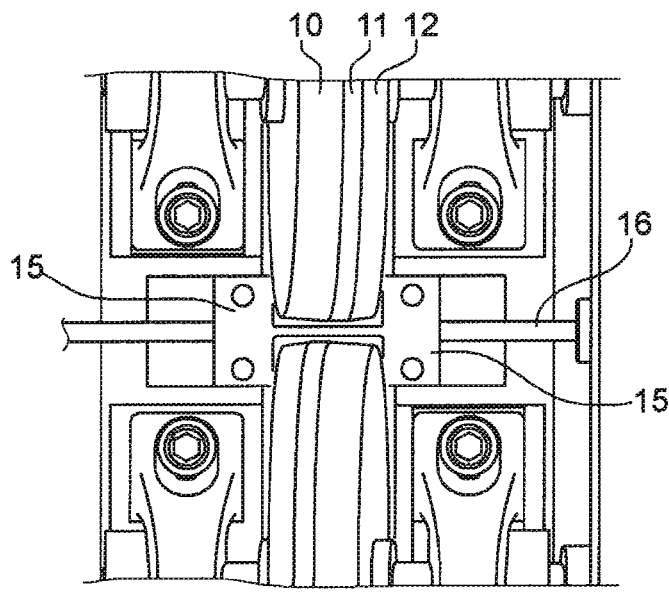
Figure 4:
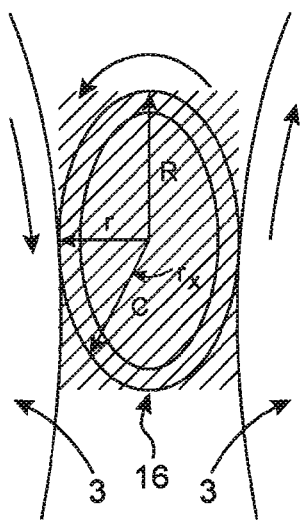
Figure 5:
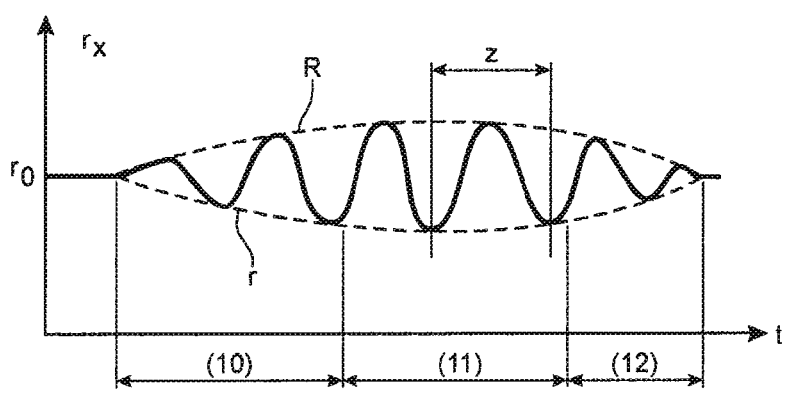

The invention will now be described in connection with the figures, amongst which:

FIG. 1 is a perspective view of the machine,
FIG. 2 is a side view of the machine,
FIG. 3 is an overhead view of the machine,
FIG. 4 illustrates an ovalisation, and
FIG. 5 illustrates all the ovalisation cycles.

The machine comprises a frame on which a geared motor 2 and a pair of opposite-facing rollers 3 are mounted. The rollers are arranged on shafts 4 rotating in pairs of bearings 5, and provided with a pinion 6 at one end. The geared motor 2 also comprises an output pinion 7. A chain 8 is tensioned between the pinions 6 and 7 to impose equal rotation and in the same direction to the shafts 4 and rollers 3. The rollers 3, on the edges thereof 9, comprise a conical leading portion 10 (first reached by the claddings 16), a central portion 11 and a conical output portion 12 (via which the claddings leave the rollers 3) which connect together without any variation in diameter, the conical portions 10 and 12 fanning out towards the central portion 11 which therefore forms the widest part of the roller 3 (their conical shape is exaggerated in the illustration in FIG. 3). The pairs of bearings 5 are mounted on carriages 13 joined to the frame by respective adjusting screws 14 which are aligned so that rotation thereof allows variation in the distance between the carriages 13 and in the spacing between the rollers 3. Finally, the device further comprises a cladding-guide 15 mounted on the frame 1 between the carriages 13 to receive a cladding 16 containing nuclear fuel and which, to apply the decladding method, was previously opened using any process in which one end of the cladding 16 is cut off; an opening 17 in the cladding-guide 15 allows insertion of the cladding 16 in the machine.

It is to be noted that some processes for cutting the cladding 16 may lead to narrowing at the opening, which may hamper fuel removal, but this part can be removed by milling the end of the cladding 16.

The machine operates as follows. The geared motor 2 is set in operation and the cladding 16 is inserted in the cladding guide 15 via the opening 17. It is caught by the rollers 3, whose spacing is chosen in relation to the diameter of the cladding 16, and is gradually deformed by the leading portion 10, the deformation is maintained via the central portion 11 and the cladding is then released with restored rotundity via the output portion 12. Cyclic ovalisation of the cladding 16 occurs, which is initially increasing, then stable and then decreasing as and when the cladding 16 passes through the leading portion 10, the central portion 11 then the output portion 12, and crushes the compact fuel without impairing the restored rotundity of the cladding 16 on leaving the machine.

Some explanations are given with respect to FIGS. 4 and 5. Each section of the cladding 16 assumes an oval, more or less elliptic shape when passing between the rollers 3 causing deformation thereof. The maximum radius of the oval shape is R, and the minimum radius is r, which is dependent upon the distance between the rollers 3 at the section under consideration of the cladding 16. Any point C of the cladding has a radius $r_x$. FIG. 5 illustrates the changes in radius $r_x$ of point C over time, as and when the cladding 16 progresses between the rollers 3 whilst being rotated; from a flat part corresponding to radius $r_o$ of the cladding 16 in the non-deformed state (round shape), the curve traces increasingly greater undulations at a first step (corresponding to passing of the section of cladding 16 to which point C under consideration belongs) through the leading portion 10, then equal undulations when the section passes through the central portion 11, then increasingly smaller undulations when it passes through the output portion 12, and the radius of point C has re-assumed a stable value close to $r_o$ when its section leaves the rollers 3: a more or less round shape has been restored. The upper envelope of the curve passes through the largest radii R, the lower envelope through the smallest radii r. An ovalisation cycle Z corresponds to a half-turn of the cladding 16 and to the changeover of point C from a large radius R to a small radius r, or to a complete undulation of the curve in FIG. 5. This curve is successively observed by all the points of all the sections of the cladding 16. The ovalisation reached at a cycle Z can be defined for example as the decrease in the original radius $r_o$ of the round shape at the point where the oval shape has the smallest radius, i.e.

$$\left(\frac{r_0 - r}{r_0}\right),$$

so that zero ovalisation corresponds to the round shape and large ovalisation corresponds to a very flattened shape.

The axes of the rollers 3 are essentially parallel to the direction of travel of the cladding 16; however they are tilted in opposite directions relative to the direction of the cladding 16 when the cladding enters into the travel path defined by the alignment of the cladding-guide 15, one tilted towards the front of the cladding 16 and the other towards the rear, so that the rollers 3 exert a translational movement on the cladding directed forwardly thereby causing the cladding 16 to progress between the rollers 3. These tilt angles can be seen in FIG. 3. It could be similarly said (cf. FIG. 2) that the respective axes X and X' of the rollers form opposite angles +B and −B relative to a plane passing through the centres of the rollers 3 and parallel to the cladding 16.

If the frame lies at an angle from the horizontal, or more generally if the cladding 16 passes through the machine at an angle so that the opening 17 for cladding insertion directs the claddings downwardly, the crushed fuel is immediately released from the cladding 16 to fall into a hopper below (not illustrated).

Some more tangible information will now be given to describe the invention under usual conditions. The cladding 16 can be set in rotation at about 300 rpm. Ovalisation by the central portion 11 of the rollers can produce efficient crushing, with final restoring of the round shape of the cladding 16, when it produces a reduction of 5% to 15% in the outer diameter of the cladding 16, so that the inner diameter of the cladding 16, at the point that is most narrowed with this ovalisation value, is smaller than the diameter of the fuel by about 0.3 to 0.6 mm. The tilt angle $_-^+$B of the rotation axes of the rollers 3 may be approximately 1 to 2°. With this small angle, and reasonable width of the central portion 11, it is possible to create maximum ovalisation of each section over 20 turns, i.e. a total of 40 ovalisations at every angle point C of the cladding and its content. This number should provide general and sufficiently fine crushing of the fuel. The tilt angle of the cladding-guide 15 may lie between 15° and 90° to the horizontal (angle A in FIG. 2). The width of the central portion 11 may be approximately 10 mm. The leading portion 10 has the effect of gradually deforming the cladding 16 without excessive jerking, and the output portion 12 has the property of applying increasingly weaker plastic deformations so that the cladding is gradually restored to its original round shape.

With the parameters set forth above, the following distribution of particle size was ascertained for fragmented and powdered fuel pellets obtained with the machine, for claddings filled with non-irradiated uranium oxide pellets 7.2 mm in diameter and 10.1 mm in length.

| Particle size family (mm) | Mass fraction (%) | Accumulated fraction (%) |
|---|---|---|
| $\phi < 0.080$ | 15.8% | 15.8% |
| $0.08 < \phi < 0.125$ | 3.8% | 19.6% |
| $0.0125 < \phi < 0.16$ | 2.6% | 22.2% |
| $0.16 < \phi < 0.2$ | 1.5% | 23.7% |
| $0.2 < \phi < 0.315$ | 5.3% | 29.0% |
| $0.315 < \phi < 0.5$ | 6.3% | 35.3% |
| $0.5 < \phi < 0.8$ | 6.6% | 41.9% |
| $0.8 < \phi < 1.25$ | 8.6% | 50.6% |
| $1.25 < \phi < 1.8$ | 6.8% | 57.4% |
| $1.8 < \phi < 2$ | 2.2% | 59.6% |
| $2 < \phi < 3.15$ | 14.9% | 74.5% |
| $\phi > 3.15$ | 25.4% | 99.9% |

The invention claimed is:

1. Method for removing nuclear fuel from circular claddings, the fuel being in a compact state, comprising a step consisting of inserting the cladding in a machine applying deformation to the cladding by repeated ovalisation over a plurality of cycles entailing plastic deformations of the cladding, characterized in that ovalisation during the cycles is progressive from one cycle to the other and then degressive, so as to crush the fuel and then restore the claddings to the original circular shape; and tilting the cladding to remove the nuclear fuel from the cladding when the nuclear fuel is crushed.

2. The nuclear fuel decladding method according to claim 1, characterized in that the fuel is crushed over at least forty cycles.

3. The nuclear fuel decladding method according to claim 1, characterized in that ovalisation is applied by reducing by at least 3% the diameter of the fuel when in the compact state.

4. A machine for applying deformation to fuel claddings, comprising a pair of opposite-facing rollers and a motor setting the rollers in rotation, characterized in that the rollers comprise a peripheral edge with a conical leading portion and a conical output portion, the leading portion and the output portion both extending towards a central portion of the rollers, wherein the central portion is cylindrical, and in that the rollers have axes of rotation that are essentially parallel to a direction of travel of the claddings through the machine, so that all said portions of the edge of the rollers contribute towards deforming the claddings.

5. The machine according to claim 4, characterized in that the rollers have axes of rotation tilted in directions opposite to the said direction.

6. The machine according to claim 5, characterized in that the rollers are tilted at no more than 2° relative to the said direction.

7. The machine according to claim 4, characterized in that it comprises a cladding guide which is tilted relative to a horizontal direction.

8. The process according to claim 3, wherein a maximal ovalization produces a reduction of 5% to 15% in an outer diameter of the cladding.

* * * * *

UNITED STATES PATENT AND TRADEMARK OFFICE
CERTIFICATE OF CORRECTION

PATENT NO. : 8,708,258 B2  
APPLICATION NO. : 13/126159  
DATED : April 29, 2014  
INVENTOR(S) : Hubert Danten Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this

Twenty-ninth Day of September, 2015

Michelle K. Lee  
*Director of the United States Patent and Trademark Office*